March 6, 1951 W. ERNST ET AL 2,544,074
COLLAPSIBLE FRAME FOR UTILITY BASKETS
Filed Dec. 7, 1946 3 Sheets-Sheet 1
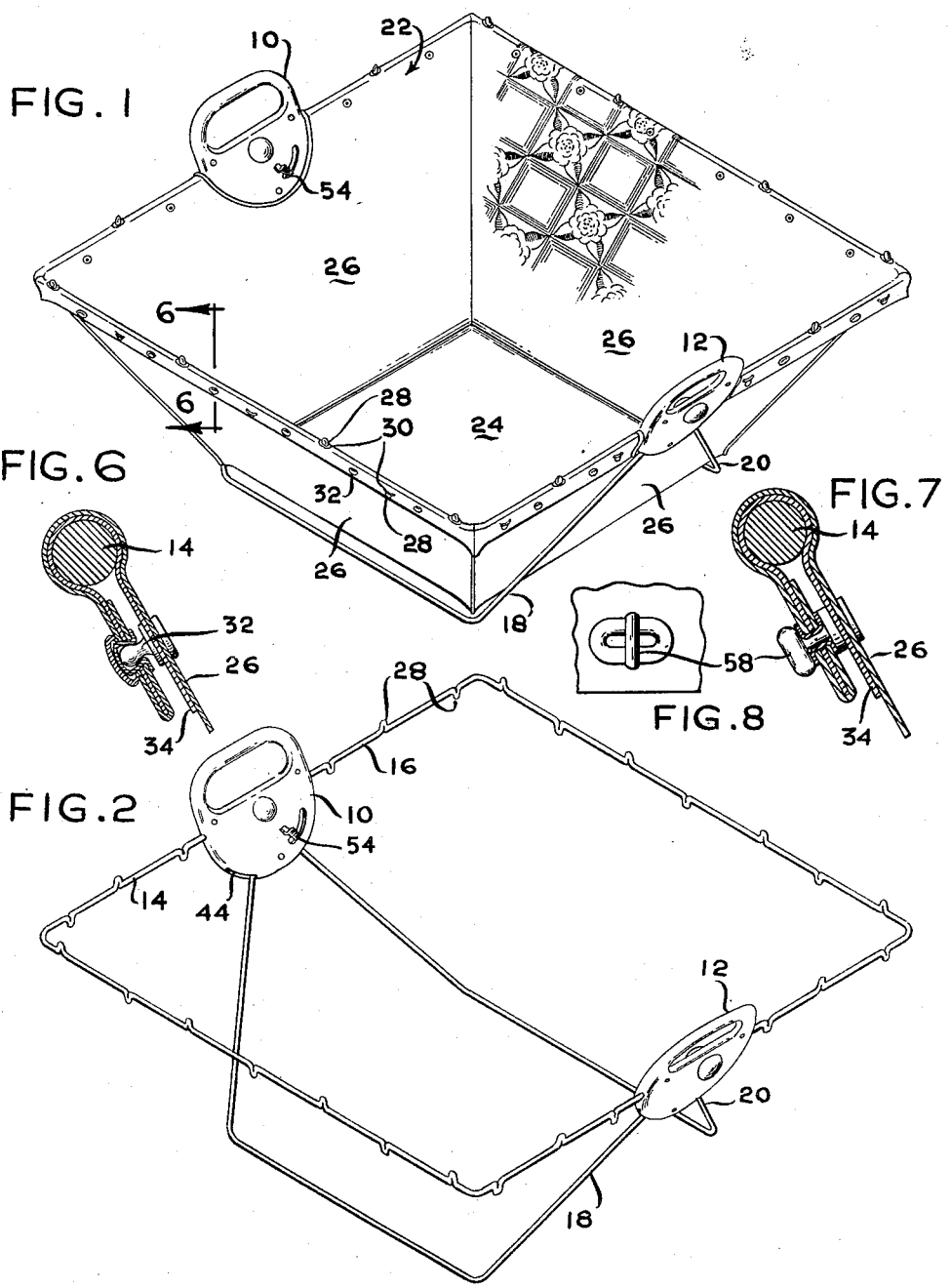
INVENTOR
WALTER ERNST
FRANK E. BONNER
BY
Toulmin & Toulmin
ATTORNEYS

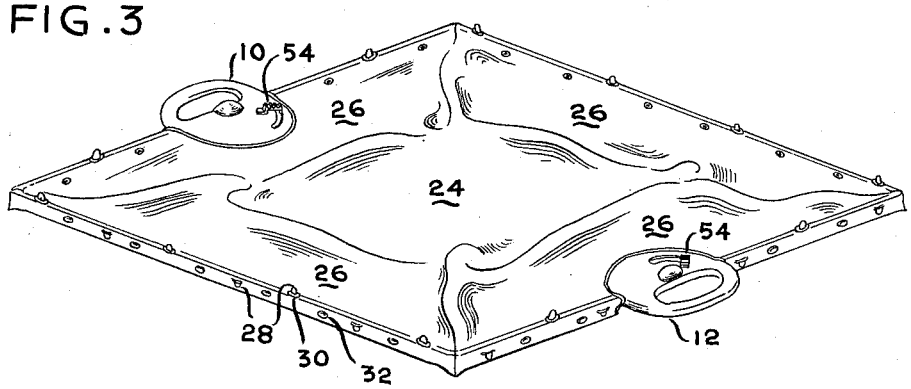
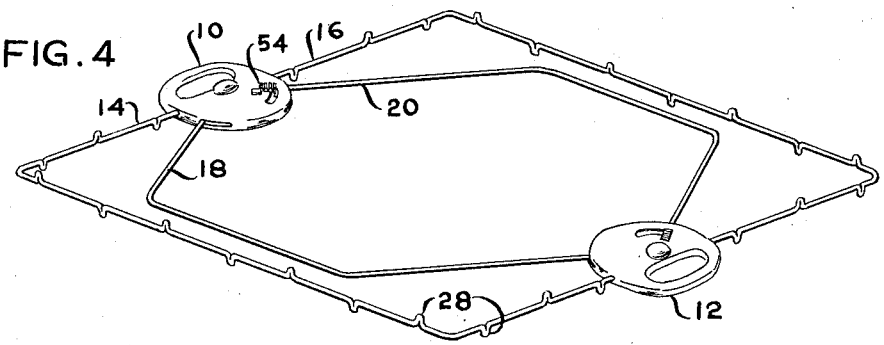
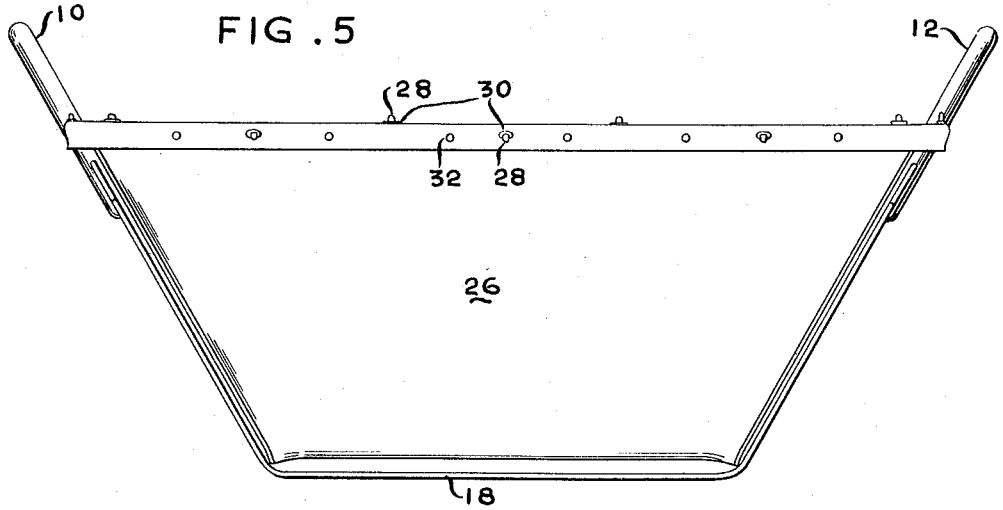

March 6, 1951 W. ERNST ET AL 2,544,074
COLLAPSIBLE FRAME FOR UTILITY BASKETS
Filed Dec. 7, 1946 3 Sheets-Sheet 3

INVENTOR
WALTER ERNST
FRANK E. BONNER
BY
Toulmin & Toulmin
ATTORNEYS

Patented Mar. 6, 1951

2,544,074

UNITED STATES PATENT OFFICE 2,544,074

COLLAPSIBLE FRAME FOR UTILITY BASKETS

Walter Ernst, Mount Gilead, and Frank E. Bonner, Dayton, Ohio, assignors to Columbus Coated Fabrics Corporation, Columbus, Ohio, a corporation of Ohio Application December 7, 1946, Serial No. 714,842

8 Claims. (Cl. 150—49)

This invention relates to utility baskets, and especially to collapsible utility baskets.

The particular object of the present invention is to provide an improved utility basket which is inexpensive to manufacture and easy to assemble.

It is also an object to provide a frame for a utility basket which is collapsible and which latches in either its opened or collapsed position.

A still further object of the invention is to provide a frame for a utility basket which may be latched in an open or collapsed position by mere actuation of handle means and latching means carried by the frame.

Another object of the invention is the provision of a frame for a utility basket which may be latched in an open or collapsed position by actuating handle means and latch means carried by the frame, said frame comprising a first member for forming the upper rim of the basket and other members pivoted to opposite points on said first member and adapted to form the supporting legs of the basket.

Yet another object of the invention is the provision of a frame for a utility basket comprising a first member for forming the upper rim of the basket and other members pivoted to opposite points on said first member and adapted to form the supporting legs of the basket, handle means on said first member, means actuated by movement of said handle means and engageable with said other members to move said other members from their basket supporting position into a position whereby they are substantially co-planar with said first member and latching means including mechanism for establishing an interlock between said last mentioned pair of members and said handle means for retaining said handle means and other members in their two operative positions.

These and other objects and advantages will become more apparent upon reference to the following description taken in connection with the accompanying drawings in which:

Figure 1 is a perspective view of a basket according to this invention in its opened position;

Figure 2 is a view similar to Figure 1 but with the cover removed and showing the basket frame;

Figure 3 is a view of the basket in its collapsed position;

Figure 4 is a view similar to Figure 3 but with the cover removed to show the frame;

Figure 5 is a side elevation of the basket showing the general configuration thereof;

Figure 6 is a sectional view indicated by the line 6—6 on Figure 1 and showing one of the snaps which retains the cover in position;

Figures 7 and 8 are views similar to Figure 6 but show another form of snap which may be employed to retain the cover on the frame;

Figures 9, 10:
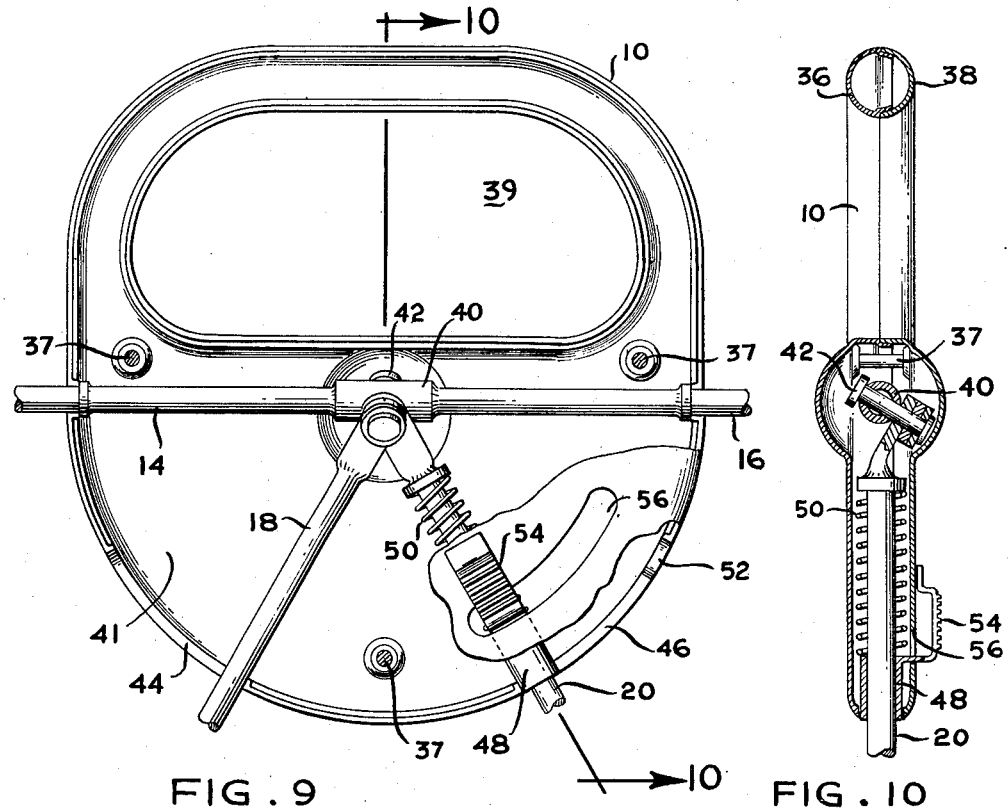
Figure 9 is an enlarged view through one of the handles of the basket showing the construction thereof.
Figure 10 is a sectional view indicated by the line 10—10 on Figure 9 and showing the handle and latching mechanism.

Referring to the drawings, the basket according to this invention comprises spaced apart handles 10 and 12 which, as best seen in Figures 2 and 4, support the frame members 14 and 16 which form a substantially rectangular upper frame for the basket. Also extending from the handles 10 and 12 are the frame members 18 and 20 which form supporting legs for the unit when it is in its opened position.

As best seen in Figure 5, the handles and frame members 18 and 20 are inclined downwardly and inwardly from the plane of the basket frame formed by the members 14 and 16 so that the general configuration defined by the frame is that of a frustum of a pyramid.

Carried by the frame members 14 and 16 is a framework body portion or lining or cover for the framework generally indicated at 22 which consists of oilcloth, heavy canvas, leatherette or some other suitable material and which has the substantially flat bottom portion 24 and the inclined side wall portions 26, the latter extending over the frame members 14 and 16.

For supporting loads placed within the cover 22, the frame members 14 and 16 preferably comprise a plurality of studs or lugs as indicated at 28 and which may be integrally formed with the said frame members, as shown, or may be secured thereto in any suitable manner. The edges of the side portions 26 of the cover 22 which pass around the frame members 14 and 16 have a plurality of eyelets 30 therein which receive the lugs 28 in order to distribute the stress of the load in the basket over the cloth of the cover.

The cover is additionally retained in position on the frame by a plurality of snap fasteners 32 carried along the edge of the said cover and which, when opened, permit the easy removal of the cover for cleaning or replacement. Preferably, the portion of the cover in which the aforementioned eyelets and snap fasteners are placed is re-inforced by a strip of material as indicated at 34 in Figure 6 and which may be of any suitable tear resistant material such as heavy canvas or duck.

As mentioned before, the basket of this invention is collapsible. The means for bringing about the collapsing of the basket from its position in Figures 1 and 2 into its position in Figures 3 and 4 comprises mechanism associated with the handles 10 and 12 and which is best illustrated in Figures 9 through 12.

Reference to Figures 9 and 10 wherein there is shown the handle 10 will reveal that the handle is formed of a pair of hollow halves consisting of the male portion 36 and the female portion 38 which are secured together as by the rivets 37 and which define the gripping aperture 39 and the hollow lower portion 41. Extending transversely through the handle formed by the said portions are the frame members 14 and 16 and these members are preferably made integral as by the sleeve 40 which may be welded to the opposed ends of the members 14 and 16.

Extending transversely through the sleeve 40 is a pivot pin 42 and pivotally mounted on the end of the pin are the ends of the frame members or legs 18 and 20. The legs 18 and 20 extend through slots 44 and 46, respectively, which permit movement of the said legs in the handles from the position shown in Figure 2 to the position shown in Figure 4.

The legs are latched in both of their extreme positions by a latching mechanism one form of which is illustrated in Figures 9 and 10. This mechanism consists of a sleeve 48 reciprocably mounted on the leg 20 and spring pressed by a spring 50 to extend through the slot 46. The slot 46 is of a size which will closely receive the leg 20 and at each end thereof are notches 52 for receiving the end of the sleeve 48. The sleeve 48 has secured thereto the serrated thumb portion 54 which extends through a slot 56 in the portion 38 of the handle 10 and is for the purpose of reciprocating the sleeve 48 out of the notches 52.

Figure 11:
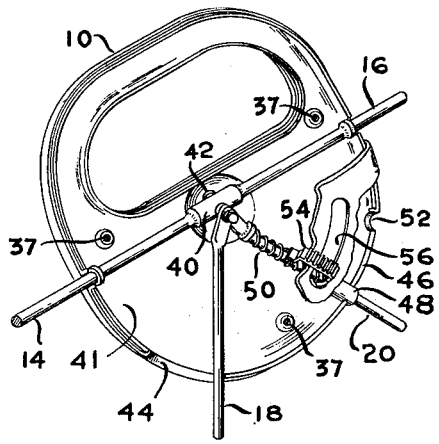
Figures 11 and 12 are perspective views, partly broken away, of the handle showing the frame in opened and collapsed position, respectively.
Figure 12:
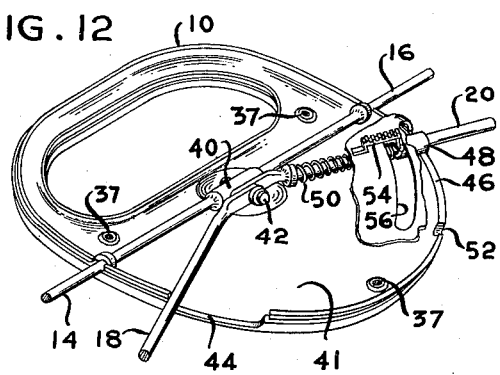

In Figures 11 and 12 is illustrated how the frame of the basket is moved from its opened to its collapsed position. Assuming the basket is in its opened position, the handles and frame members will occupy the position illustrated in Figure 11. Then, in order to collapse the basket, the thumb portions 54 connected with the sleeves 48 are drawn toward the pivot pins 42. This is readily accomplished by the thumbs when the handles are being grasped by the hands.

It will be noted upon reference to Figures 3 and 4 that the handle 10 is arranged so that the basket is most easily collapsed when it is grasped by the left hand while the handle 12 is adapted for being grasped by the right hand.

After the sleeves 48 have been withdrawn from the lower of the notches 52 by the actuation of the thumb portions 54, the handles 10 and 12 are pressed outwardly of the basket at their upper edges and pivot about the upper frame into their Figure 12 position. At this time the basket frame is collapsed into its flat position and the sleeves 48 drop into the upper notches 52 by the action of the springs 50. This maintains the basket latched in its collapsed position so it can readily be stored in a minimum of space.

It will be apparent that the latching means described above is only one form of latch which may be employed and that many other devices will occur to those skilled in the art and may be applied to either of the legs 18 and 20 or to both thereof according to individual preference.

It will also be evident that the particular configuration shown of the upper frame wherein there are a plurality of lugs extending upwardly and downwardly therefrom is not the only type of frame member which would satisfactorily support the cover 22 and, also, that the snap fasteners 32 could be replaced by a turn type snap such as indicated at 58 in Figures 7 and 8.

This application is a continuation in part of Ernst et al. application Serial No. 714,844, filed December 7, 1946.

It will be understood that this invention is susceptible to modification in order to adapt it to different usages and conditions and, accordingly, it is desired to comprehend such modifications within this invention as may fall within the scope of the appended claims.

We claim:

1. In a utility basket; a first frame member shaped into a flat loop and forming the upper rim of the basket; a pair of other members pivoted to opposite points on said first member and normally extending downwardly therefrom to provide supporting legs for the basket; handle means on said first frame member and engageable with said other members for relatively moving said other members about their pivotal connection from an open position of the basket into a substantially flat position; and releasable latch means comprising mechanism for establishing an interlock between said other members and said handle means to retain said members in either their open or flat position.

2. In a collapsible utility basket; a first frame member comprising a loop and forming the upper rim of the basket; a pair of other members movably carried on said first member and normally extending downwardly therefrom to form supporting legs for the basket; handle means on said first member; means actuated by movement of said handle means on said first member and engageable with said other members to move said other members from their basket supporting position into a position wherein they are substantially coplanar with said first member; latching means including mechanism for establishing an interlock between said last mentioned pair of members and said handle members for retaining said handle means and other members in their two operative positions, and mechanism for breaking said interlock to release said latching means.

3. In a collapsible frame for a utility basket; an upper frame member in the shape of a loop; a pair of handles on said upper member at opposite points therearound and pivotally mounted on the axis of the member; other members extending between said points and pivotally connected with said upper frame member on an axis transverse thereto, said other members being movable from a first position wherein they act as supporting legs for said upper frame member into a second position wherein they are coplanar with said upper member; cam surfaces on said handles engaging said other members, to move the latter as an incident to pivotal movement of said handles; latch means in said handles for retaining said handles and said other members in either of their two operative positions relative to said upper member, and mechanism to release said latch means to permit of said pivotal movement.

4. In combination; a plurality of members pivoted together and movable from a coplanar position to a non-coplanar position; a hollow handle surrounding the pivotal connection of said members and pivoted on one thereof; said handle having slots therein to receive the other of said members for movement thereof between their two positions relative to said one member by pivotal rotation of said handle on said one member; latch means engageable with other members and carried in said handle to establish an interlock between each of said handles and said members to detain said members in either of their two relative positions, and mechanism for releasing said latch means.

5. In combination; a plurality of members pivoted together and movable from a coplanar position to a non-coplanar position; a hollow handle surrounding the pivotal connection of said members and pivoted on one of said members; said handle having slots therein at one side of the said one member through which the other of said members project for movement therein between two positions relative to said one member in one of which the said other members are coplanar with the said one member and in another of which the said other members are non-coplanar with said one member; and latch means carried in said handle and operable releasably to retain said members in either of their two relative positions, said latch means comprising a part resiliently movable on one of said members, and means carried by said handle releasably receiving said part when the said members are in either of the said two relative positions to establish an interlock between said handle and said members.

6. In combination; a plurality of members pivoted together and movable from a coplanar position to a non-coplanar position; a hollow handle surrounding the pivotal connection of said members and pivoted on one of said members; said handle being formed with slots at one side of the said one member through which the other of said members project for movement therein between two positions relative to said one member in one of which the said other members are coplanar with the said one member and in another of which the said other members are non-coplanar with said one member; and latch means carried in said handle and operable releasably to retain said members in either of their two relative positions, and said latch means comprising a sleeve resiliently slidable on one of said other members, said handle having cut-out portions communicating with said slot for receiving said sleeve when the said members are in either of the said two relative positions.

7. In a collapsible basket; a hollow handle having a hand grip opening; a first frame member extending through said handle and about which said handle is rotatable; other frame members extending into said handle and pivoted to said first member therein; said handle being formed with slots receiving said other members for permitting their movement about their pivotal connection with said first member to and from a coplanar position therewith; latch means carried by said handle and engageable with said other frame members for latching said other frame members in their coplanar and in their non-coplanar positions; and a slide in operable cooperation with said latch means and including a portion engageable by and operable with the thumb when the handle is being gripped for releasing said latch means, whereby to permit relative pivotal movements of said members by rotary movement of said handle about the first member.

8. In a collapsible basket; a hollow handle having a hand grip opening; a first frame member extending through said handle and about which said handle is rotatable; other frame members extending into said handle and pivoted to said first member therein on an axis transverse to said first member; said handle having slots receiving said other members for permitting their movement about their pivotal connection with said first member to and from a coplanar position therewith; a sleeve on one of said other members; said handle being formed with a cut-out portion at each end of the slot for receiving the sleeve; yielding means continuously urging said sleeve toward said cut-out portions; and a slide operable by the thumb while said handle is being gripped for withdrawing the sleeve from the cut-outs to permit relative pivotal movement of said members by the rotary movement of said handle about said first member.

WALTER ERNST.
FRANK E. BONNER.

REFERENCES CITED

The following references are of record in the file of this patent:

UNITED STATES PATENTS

| Number | Name | Date |
|---|---|---|
| 706,426 | Langston | Aug. 5, 1902 |
| 1,102,499 | Haist | July 7, 1914 |
| 1,906,174 | Miller | Apr. 25, 1933 |
| 1,942,771 | Phillips | Jan. 9, 1934 |
| 2,030,204 | Gray | Feb. 11, 1936 |
| 2,168,913 | Middleton | Aug. 8, 1939 |
| 2,228,248 | Ahlmark | Jan. 14, 1941 |

FOREIGN PATENTS

| Number | Country | Date |
|---|---|---|
| 71,060 | Sweden | Feb. 3, 1931 |